United States Patent [19]
Cheng et al.

[11] 3,972,841
[45] Aug. 3, 1976

[54] POLYPHOSPHAZENE ELASTOMER WITH UP TO 35 MOLE PER CENT NON-FLUORINATED ALKOXY GROUPS HAVING IMPROVED LOW TEMPERATURE FLEXIBILITY

[75] Inventors: Tai Chun Cheng, Akron; Gary S. Kyker, Uniontown; Thomas A. Antkowiak, Rittman, all of Ohio

[73] Assignee: The Firestone Tire & Rubber Company, Akron, Ohio

[22] Filed: Jan. 29, 1975

[21] Appl. No.: 544,976

[52] U.S. Cl. ............... 260/2 P; 260/47 P; 260/47 UA; 526/246; 526/247; 526/248; 526/276
[51] Int. Cl.² ............... C08G 73/00; C08G 79/02
[58] Field of Search ............ 260/47 P, 2 P, 47 UA, 260/80 PS

[56] References Cited
UNITED STATES PATENTS
3,700,629   10/1972   Reynard et al. .................. 260/47 P
3,702,833   11/1972   Rose et al. ........................ 260/2 P
3,856,712   12/1974   Reynard et al. .................. 260/2 P
3,888,799    6/1975   Rose et al. ...................... 260/80 PS
3,896,058    7/1975   Reynard et al. .................. 260/2 P OTHER PUBLICATIONS
Chem. & Eng. News, July 14, 1975 — p. 29.

Primary Examiner—Joseph L. Schofer
Assistant Examiner—Peter F. Kulkosky

[57] ABSTRACT

The low temperature physical properties of copolymers and terpolymers containing fluoroalkoxy groups such as are described in U.S. Pat. Nos. 3,515,699 and 3,700,629 are improved by the incorporation of up to 35 mol % of non-fluorinated alkoxy groups in the polymers in place of some of the fluoroalkoxy groups. The polyphosphazenes of this invention also preferably contain a small amount of unsaturated substituent on the phosphazene backbone to enhance curability.

4 Claims, 2 Drawing Figures

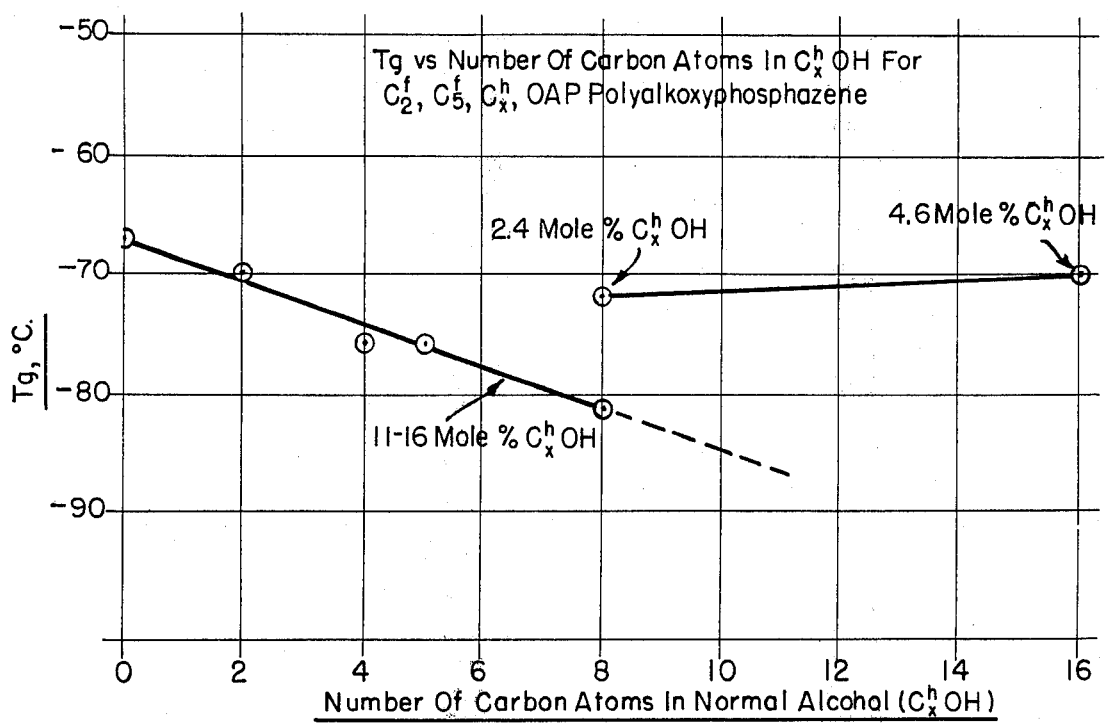
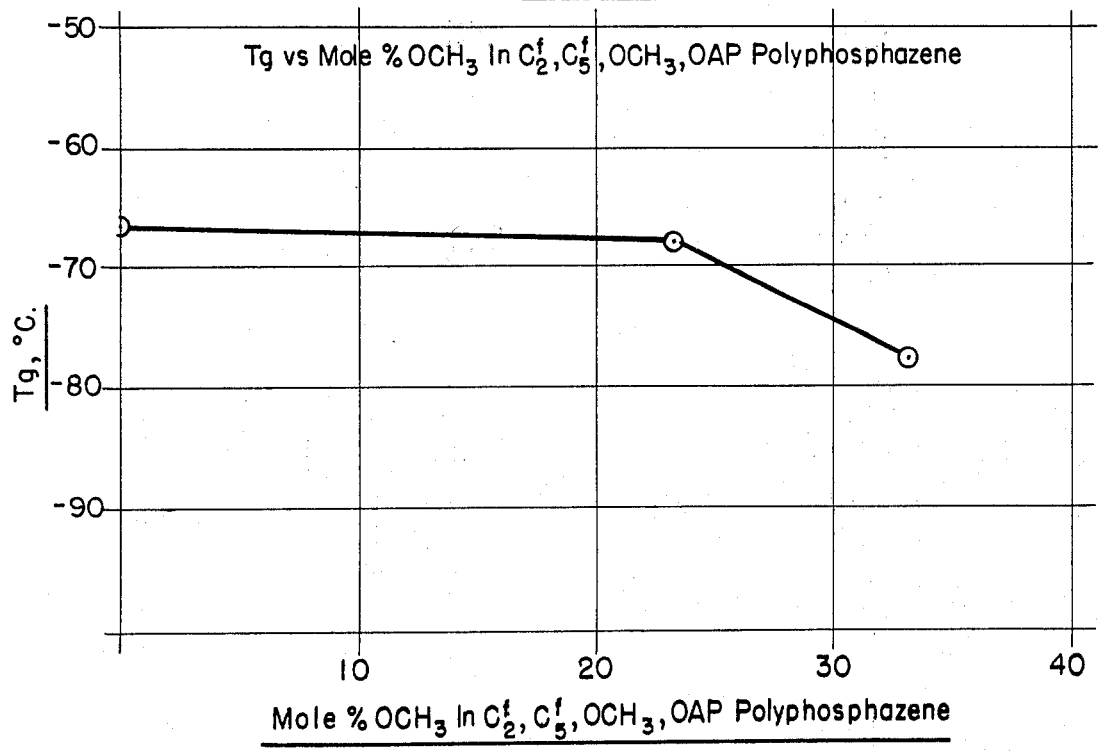

POLYPHOSPHAZENE ELASTOMER WITH UP TO 35 MOLE PER CENT NON-FLUORINATED ALKOXY GROUPS HAVING IMPROVED LOW TEMPERATURE

This invention relates to polyphosphazenes with improved low temperature properties.

Polymers based on phosphazenes which contain a substantially linear backbone consisting of alternating N and P atoms and represented as

in which $n$ represents an integer between about 10 and about 50,000 or more, and various substituents attached to the phosphorus atoms have been the subject of a number of recent United States Patents including the following:

U.S. Pat. No. 3,370,020 which issued Feb. 20, 1968 describes homopolymers in which all of the groups attached to all of the phosphorus atoms are identical;

U.S. Pat. No. 3,515,688 which issued June 2, 1970 and U.S. Pat. No. 3,700,629 which issued Oct. 24, 1972 describe copolymers in which two different groups are attached to the phosphorus atoms of the phosphazene backbone;

U.S. Pat. No. 3,702,833 which issued Nov. 14, 1972 describes terpolymers in which three different groups are randomly distributed in the polyphosphazene.

The present invention is directed to an improvement in such polyphosphazenes.

Briefly, it has been found that the low temperature physical properties of copolymers and terpolymers containing fluoroalkoxy groups such as are described in U.S. Pat. Nos. 3,515,688 and 3,700,629 are improved by the incorporation of up to 35 mol % of non-fluorinated alkoxy groups in the polymers in place of some of the fluoroalkoxy groups. The polyphosphazenes of this invention also preferably contain a small amount of unsaturated substituent on the phosphazene backbone to enhance curability.

The principal object of this invention is to provide polyphosphazenes with improved low temperature properties as compared with prior art fluoroalkoxy substituted phosphazene polymers.

The invention will be described with particular reference to a preferred phosphazene polymer in which the substituents on the phosphorus are:

—$OCH_2CF_3$ hereinafter $C_2{}^f$
—$OCH_2C_3F_6CF_2H$ hereinafter $C_5{}^f$
—amyloxy hereinafter $C_5{}^h$ and
—o—allylphenoxy hereinafter OAP.

Other fluorine substituted alkoxy groups of the types described in Rose, U.S. Pat. No. 3,515,688 issued June 2, 1970 are suitable in place of the $C_2{}^f$ or $C_5{}^f$ groups in the illustrative polyphosphazene and both fluorinated groups differ; and other alkoxy groups may be present in place of the amyloxy substituent, suitable replacements being represented by the formula $O(CH_2)_nCH_3$ wherein $n$ is an integer from 0 to 15 and the alkoxy may be either a straight chain or a branched chain; and in place of the o-allylphenoxy substituent, other groups with some unsaturation may be used to facilitate curing such groups including allyloxy, crotyloxy, eugenol and others with unsaturation in the side chain, such substituents being represented by the general formula

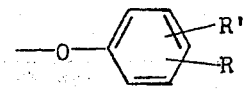

wherein R' is selected from the group consisting of H, alkyl ($C_1$–$C_4$), or alkoxy ($C_1$–$C_4$), and in which R includes some unsaturation, e.g., an alkenyl group such as vinyl, allyl, crotyl or the like.

The phosphonitrilic polymers of this invention, are conveniently prepared from suitable alcohols and fluoroalcohols which are first converted to alkoxides or fluoroalkoxides and then reacted with linear, soluble $(NPCl_2)_x$ polymer in the manner described in the above noted United States Patents.

Synthesis of the $C_2{}^fC_5{}^fC_5{}^h$OAP polyphosphazenes of this invention was accomplished as follows:

The alcohols and fluoroalcohols and sodium were weighed separately into bottles, (the amounts of alcohols and sodium are shown in Tables I to V), mixed with tetrahydrofuran, and capped in a Dry-Box. About 350 ml of tetrahydrofuran was added to the sodium.

The sodium tetrahydrofuran mixture was added to a three-necked flask equipped with a stirrer, Dry-Ice condenser, dropping funnel and an argon purge line. Under argon purge, the alcohols in tetrahydrofuran were added dropwise with stirring over a period of about 2 hours at a cooling bath temperature of 0° to −20°C. After addition of the alcohols, the reaction mixture was stirred overnight at room temperature. With all of the sodium gone, the reaction mixture was a light yellow color.

Then 100 g of linear $(NPCl_2)_n$ dissolved in 1200 ml of benzene was added rapidly (20 to 30 min.) to the alkoxide solution with vigorous stirring. An exotherm caused the reaction to reflux (150° to 165°F). Following the addition, the reaction mixture was stirred at reflux temperature for 5 hours. Upon cooling, polymer was isolated by coagulation.

The invention will be more fully understood from the data which follows, taken with the drawings accompanying this application.

The figures accompanying this application are two graphs.

FIG. 1 is a plot of Tg(°C) of the polymer vs the number of carbon atoms in the nonfluorinated alkoxy groups, e.g., as described in Table III; and FIG. 2 is a plot of Tg(°C) of the polymer vs the % of methoxy groups in the terpolymer as shown in the last two columns of Table III.

The data shown in Tables I to V relate to the synthesis of various polyphosphazenes and the effect of the presence of various amounts of $C_x{}^h$ in the side chains attached to the P atoms.

Tables I and II set forth the results of synthesis of $C_2{}^fC_5{}^fC_5{}^h$OAP polyphosphazenes with various relative proportions of the substituents, namely:

from about 30% to 74% $C_2{}^f$
16% to 53% $C_5{}^f$
10% to 21% $C_5{}^h$ and
0.4% to 1.4% OAP.

Table III sets forth the effects of variations in the % of $C_x^n$ from about 2 mol % to 33 mol % with $x$ being 1, 2, 4, 5, 8 and 16, particularly the effect on Tg.

Table IV sets forth the synthesis using a commercially available mixture of fluoroalcohols containing various amounts of $C_3$ to $C_{11}$ fluoroalcohols; and Table V sets forth the effect of non-fluorinated alkoxy substituents on Gehman low temperature flexibility of $C_2^f$, $C_5^f$/OAP vulcanizates.

Table I

SYNTHESIS OF $C_2^f$, $C_5^f$, $C_5^n$, OAP POLYALKOXYPHOSPHAZENE

| Polymer No. | 1021-9 | 1022-15-F | 1022-36-F | 1022-43-F | 1021-22 | 759-84 |
|---|---|---|---|---|---|---|
| moles (PNCl$_2$)$_n$ | 0.754 | 0.86 | 0.86 | 2.58 | 0.86 | 1.725 |
| moles Alkoxides (Theory) | 1.508 | 1.72 | 1.72 | 5.16 | 1.72 | 3.45 |
| Charged | | | | | | |
| moles Na (%)* | 1.66 (110) | 1.91 (111) | 1.91 (111) | 5.73 (33) | 1.89 (110) | 3.78 (110) |
| moles C$_2^f$(%)* | 0.91 (60) | 0.98 (57) | 0.98 (57) | 5.74 (57) | 0.86 (50) | 2.32 (67) |
| moles C$_5^f$(%)* | 0.86 (57) | 0.431 (25) | 0.432 (25) | 1.296 (25) | 0.38 (22) | 1.72 (50) |
| moles C$_5^n$(%)* | None | 1.3 (75) | 2.00 (114) | 5.7 (114) | 1.89 (110) | None |
| moles OAP(%)* | 0.045 (3) | 0.052 (3) | 0.052 (3) | 0.156 (3) | 0.052 (3) | 0.103 (3) |
| %* Alcohol | 120 | 160 | 199 | 199 | 185 | 120 |
| Yield, g (%) | 214(76.2) | 100(33) | 195(65) | 550(55) | 167(61.4) | 434.5(67.3) |
| Found (n.m.r.) | | | | | | |
| moles C$_2^f$(%)* | | 45.2 | 64.2 | 68 | 61 | 50.9 | 61.9 |
| moles C$_5^f$(%)* | | 54.8 | 20.7 | 19 | 21 | 27.6 | 38.6 |
| moles C$_5^n$(%)* | | 0 | 14.2 | 12.4 | 17.7 | 20.6 | 0 |
| moles OAP(%)* | 0.61 (UV) | 0.8 | 0.6 | 0.4 | 0.9 | |
| Tg°C | −67 | −76 | −78 | −79 | −83 | −69 |
| DSV | 2.51 | 3.44 | 7.30 | 4.60 | 7.04 | 1.69 |
| % Gel | 0 | 0 | 0 | 0 | 0 | 0 |
| % Na | 0.014 | 0.075 | 0.08 | 0.134 | 0.91 | 0.041 |
| % Cl | 0.021 | 0.15, 0.12 | 0.027, 0.03 | 0.04, 0.036 | 0.31 | 0.029 |

*% based on moles of replaceable Cl in (PNCl$_2$)$_n$

Table II

SYNTHESIS OF $C_2^f$, $C_5^f$, $C_5^n$, OAP POLYALKOXYPHOSPHAZENE

| Polymer No. | 1022-35-F | 1022-33-F | 1022-15-F | 1022-34-F |
|---|---|---|---|---|
| moles (PNCl)$_2$ | 0.86 | 0.86 | 0.86 | 0.86 |
| moles Alkoxides (Theory) | 1.72 | 1.72 | 1.72 | 1.72 |
| Charged | | | | |
| moles Na (%)* | 1.91 (111) | 1.91 (111) | 1.91 (111) | 1.91 (111) |
| moles C$_2^f$(%)* | 0.49 (28.5) | 0.49 (28.5) | 0.98 (57) | 1.21 (70) |
| moles C$_5^f$(%)* | 0.862 (50) | 0.862 (50) | 0.431 (25) | 0.259 (15) |
| moles C$_5^n$(%)* | 2.00 (114) | 2.00 (114) | 1.3 (75) | 1.3 (75) |
| moles OAP(%)* | 0.052 (3) | 0.052 (3) | 0.052 (3) | 0.052 (3) |
| %* Alcohol | 195 | 195 | 160 | 163 |
| Yield, g (%) | 240 (79.2) | 120 (39.6) | 100 (33) | 175 (58) |
| Found (n.m.r.) | | | | |
| moles C$_2^f$(%) | 32.0 | 46.0 | 64.2 | 72.4 |
| moles C$_5^f$(%) | 53.8 | 40.0 | 20.7 | 16.8 |
| moles C$_5^n$(%) | 14.2 | 13.2 | 14.2 | 10.8 |
| moles OAP(%) | 0.61 (UV) | 1.2 | 0.8 | 0.77 (UV) |
| Tg°C | −80 | −78 | −76 | −73, +65 (Tm°C) |
| DSV | 8.51 | 2.66 | 3.44 | 9.50 |
| % Gel | 0 | 0 | 0 | 0 |
| % Na | 0.25 | 0.672 | 0.0752 | 0.15 |
| % Cl | 0.31 | 0.2, 0.22 | 0.15, 0.12 | 0.014 |

*% based on moles of replaceable Cl in (PNCl$_2$)$_n$

TABLE III

EFFECT OF VARIOUS NON-FLUORINATED ALKOXY CONTENTS ON $C_2^f$, $C_5^f$, OAP POLYALKOXYPHOSPHAZENE PROPERTIES

| Polymer No. | 1022-63-F $C_x^n=C_2^n$ | 1022-64-F $C_x^n=C_4^n$ | 1022-15-F $C_x^n=C_5^n$ | 1022-71-F $C_x^n=C_8^n$ | 1022-55-F $C_x^n=C_8^n$ | 1022-54-F $C_x^n=C_{16}^n$ | 1022-70-F $C_x^n=C_1^n$ | 1022-76-F $C_x^n=C_1^n$ |
|---|---|---|---|---|---|---|---|---|
| moles (PNCl$_2$)$_n$ | 0.86 | 0.86 | 0.86 | 0.86 | 0.86 | 0.86 | 0.86 | 0.86 |
| moles Alkoxides (Theory) | 1.72 | 1.72 | 1.72 | 1.72 | 1.72 | 1.72 | 1.72 | 1.72 |
| Charged | | | | | | | | |
| moles Na (%)* | 1.91(111) | 1.91(111) | 1.91(111) | 1.91(111) | 1.91(111) | 1.91(111) | 1.91(111) | 1.91(111) |
| moles C$_2^f$ (%)* | 0.98( 57) | 0.98( 57) | 0.98( 57) | 0.85( 50) | 0.98( 57) | 0.98( 57) | 0.98( 57) | 1.16( 67) |
| moles C$_5^f$ (%)* | 0.43( 25) | 0.43( 25) | 0.43( 25) | 0.43( 25) | 0.43( 25) | 0.43( 25) | 0.862( 50) | 0.862( 50) |
| moles C$_x^n$ | 3.20(187) | 2.00(114) | 1.30( 75) | 2.16(124.5) | 1.02( 60) | 0.62( 36) | 3.28(191) | 2.09(121) |
| Moles OAP (%)* | 0.052( 3) | 0.052( 3) | 0.052( 3) | 0.052( 3) | 0.052( 3) | 0.052( 3) | 0.052( 3) | 0.052( 3) |
| %* Alcohol | 272 | 199 | 160 | 203 | 145 | 121 | 301 | 241 |
| Yield, g (%) | 165(55) | 180(60) | 100(33) | 30(40) | 180(55.7) | 190(58.8) | 140(59) | 160(59.5) |
| Found (n.m.r.) | | | | | | | | |
| moles C$_2^f$ (%) | 57.2 | 60 | 64.2 | 52.4 | 67.4 | 64.3 | 44 | 44.1 |
| moles C$_5^f$ (%) | 29.6 | 24 | 20.7 | 29.9 | 27.7 | 30.4 | 22.4 | 32.7 |
| moles C$_x^n$ (%) | 11 | 14 | 14.2 | 16.0 | 2.4 | 4.6 | 33 | 22.7 |
| moles OAP (%) | 1.16(UV) | 1.95 | 0.8 | 1.7 | 1.23(UV) | 0.8 | 0.97(UV) | 0.5 |
| Tg°C | −70 | −76 | −76 | −81 | −72 | −70 | −78 | −68 |
| DSV | 2.11 | 15.27 | 3.44 | 2.82 | 2.29 | 3.23 | 6.13 | 3.47 |
| % Gel | 0 | 0 | 0 | 0 | 0 | 0 | 0 | 0 |
| % Na | 0.129 | 0.724 | 0.0752 | 0.247 | 0.008 | 0.03 | 0.164 | 0.247 |

TABLE III-continued

| % Cl | 2.25, 2.22 | 0.08, 0.068 | 0.15, 0.12 | 0.64, 0.61 | 2.05, 2.15 | 0.24, 0.21 | 0.16, 0.17 | 0.33 |

*% based on moles of replaceable Cl in $(PNCl_2)_n$

Table IV

SYNTHESIS OF LOW TEMPERATURE POLYMER UTILIZING COMMERCIALLY AVAILABLE BLEND OF FLUOROALCOHOLS

| Polymer No. | 1022-67-F | 1022-27-F |
|---|---|---|
| moles $(PNCl_2)_n$ | 0.86 | 0.86 |
| moles Alkoxides (Theory) | 1.72 | 1.72 |
| Charged (% based on moles of replaceable Cl in $(PNCl_2)_n$ | | |
| moles Na (%) | 1.91 (111) | 1.91 (111) |
| moles $C_2{}^f$ (%) | 0.98 ( 57) | 0.98 ( 57) |
| moles $C_5{}^h$ (%) | 1.82 (105) | 2.27 (132) |
| moles $C_3{}^f$–$C_7{}^f$ (%) | 0.215( 25) | — |
| moles $C_3{}^f$–$C_{11}{}^f$ (%) | — | 0.43 ( 25) |
| moles OAP (%) | 0.052( 3) | 0.052 ( 3) |
| % Alcohol | 190 | 212 |
| Yield, g | 169 | 260 |
| Tg°C | −77 | −74 |
| DSV | 10.76 | — |
| % Gel | 0 | — |
| % Na | 0.773 | 0.049 |
| % Cl | 0.051 | 0.089 |
| % OAP Found | | |
| UV by Weight | 1.00 | 0.94 |

Table V

EFFECT OF NON-FLUORINATED ALKOXY ($C_5{}^h$) GROUPS ON GEHMAN LOW TEMPERATURE FLEXIBILITY (ASTM D1053) OF $C_2{}^f C_5{}^h$/OAP VULCANIZATES

| Stock | A(1) | B(2) | C(3) | D(4) |
|---|---|---|---|---|
| $T_5$, °F | −38 | −67 | −45 | −52 |
| $T_{10}$, °F | −45 | −72 | −54 | −62 |
| $T_{100}$, °F | −65 | −91 | −80 | −89 |

(1)Stock A Composition of Polymer (K16624) 64.0 mole % $C_2{}^f$; 35.6 mole % $C_5{}^f$(T); 0.5 mole % OAP.
(2)Stock B Composition of Polymer (R191902) 55.1 mole % $C_2{}^f$; 34.5 mole % $C_5{}^f$(T); 9.1 mole % $C_5{}^h$ and 1.30 mole % OAP.
(3)Stock C Composition of Polymer (R190279) 51.3 mole % $C_2{}^f$; 47.9 mole % $C_5{}^f$(T); 0.5 mole % OAP.
(4)Stock D Composition of Polymer–Same Polymer as used in Stock B.
All but Stock A contain 1 phr stabilizer. Stocks A & B contain 25 phr FEF black, 6 phr MgO and 2 phr Dicumyl peroxide.
Stocks C & D contain 25 phr Silanox 101, 6 phr MgO and 1–2.5 phr Dicumyl peroxide.

The beneficial effect produced by the incorporation of non-fluorinated alkoxy groups into a $C_2{}^f C_5{}^h$/OAP polyphosphazene is shown in Tables III and V and in the two figures.

Having now described preferred embodiments of the invention in accordance with the Patent Statutes, it is not intended that it be limited except as may be required by the appended claims.

We claim:

1. Phosphonitrilic fluoroelastomers represented by the following general formula:

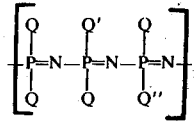

in which each Q represents a fluoroalkoxy group represented by the formula —$OCH_2C_nF_{2n}Z$, in which Z is either F or H and $n$ is an integer from 1 to 10 there being at least two different such fluoroalkoxy groups; each Q' represents an alkoxy group with up to 16 carbon atoms, and there may be more than one such group in the polymer, the amount of Q' present being sufficient to noticeably improve the low temperature physical properties of the polyphosphazenes, and each Q'' represents a group with some unsaturation which enhances the curability of said elastomer and represented by the formula

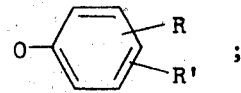

wherein R is an unsaturated monovalent group and R' is selected from the group consisting of H, alkyl and alkoxy; and in which the relative proportions of Q'':Q':Q is about 0.1–5 mole %: up to about 35 mole %: balance, the amount of Q' present being sufficient to noticeably improve the low temperature physical properties of the polyphosphazenes.

2. The elastomers of claim 1 wherein some Q's are —$OCH_2CF_3$ and some are —$OCH_2C_3F_6CF_2H$.

3. The elastomers of claim 1 in which R is an allyl group.

4. The elastomers of claim 1 in which Q' is amyloxy.

* * * * *